(12) United States Patent
Tuttle

(10) Patent No.: US 10,571,558 B2
(45) Date of Patent: *Feb. 25, 2020

(54) SYSTEMS AND METHODS TO USE RADAR IN RFID SYSTEMS

(71) Applicant: Micron Technology, Inc., Boise, ID (US)

(72) Inventor: John R. Tuttle, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 311 days.

This patent is subject to a terminal disclaimer.

(21) Appl. No.: 14/454,546

(22) Filed: Aug. 7, 2014

(65) Prior Publication Data

US 2016/0363662 A1 Dec. 15, 2016

Related U.S. Application Data

(63) Continuation of application No. 12/134,106, filed on Jun. 5, 2008, now Pat. No. 8,830,062.

(51) Int. Cl.
*G01S 13/28* (2006.01)
*G01S 13/76* (2006.01)
*G01S 13/58* (2006.01)
*G01S 13/93* (2020.01)

(52) U.S. Cl.
CPC .......... *G01S 13/765* (2013.01); *G01S 13/282* (2013.01); *G01S 13/582* (2013.01); *G01S 2013/936* (2013.01); *G01S 2013/9339* (2013.01)

(58) Field of Classification Search
CPC .... G01S 13/282; G01S 13/582; G01S 13/765; G01S 2013/9339; G01S 2013/936

USPC .......................................................... 342/42
See application file for complete search history.

(56) References Cited

U.S. PATENT DOCUMENTS

| | | |
|---|---|---|
| 4,016,568 A | 4/1977 | Makimoto et al. |
| 4,075,632 A | 2/1978 | Baldwin et al. |
| 4,804,961 A | 2/1989 | Hane |
| 5,796,362 A | 8/1998 | Ayasli et al. |
| 5,900,834 A | 5/1999 | Kubinec |
| 5,952,922 A | 9/1999 | Shober |
| 6,046,683 A | 4/2000 | Pidwerbetsky et al. |
| 6,084,530 A | 7/2000 | Pidwerbetsky et al. |

(Continued)

FOREIGN PATENT DOCUMENTS

| | | |
|---|---|---|
| KR | 20060112976 | 11/2006 |
| KR | 20070021913 | 2/2007 |
| WO | 2007047226 | 4/2007 |

OTHER PUBLICATIONS

Georgia State University, "Police Radar," located at http://hyperphysics.phy-astr.gsu.edu/hbase/sound/radar.html, Jul. 1, 2003.

(Continued)

*Primary Examiner* — Timothy A Brainard
(74) *Attorney, Agent, or Firm* — Greenberg Traurig

(57) ABSTRACT

Systems and methods to use radar systems for radio frequency identification (RFID) applications. In one embodiment, radar systems are adapted to use RFID communications protocols and methods to enhance the usefulness of radar systems beyond the determination of the presence, distance, direction and/or speed of a vehicle or object, to additionally include the transmission of data such as object identification and additional messages or data.

7 Claims, 4 Drawing Sheets

(56) References Cited

U.S. PATENT DOCUMENTS

| | | | |
|---|---|---|---|
| 6,424,916 B2 | 7/2002 | Nysen | |
| 6,456,191 B1* | 9/2002 | Federman | G06K 7/0008 235/385 |
| 6,600,418 B2 | 7/2003 | Francis et al. | |
| 6,674,403 B2 | 1/2004 | Gray et al. | |
| 6,717,516 B2 | 4/2004 | Bridgelall | |
| 6,920,330 B2 | 7/2005 | Caronni et al. | |
| 7,045,996 B2 | 5/2006 | Lyon et al. | |
| 7,049,965 B2 | 5/2006 | Kelliher et al. | |
| 7,091,863 B2 | 8/2006 | Ravet | |
| 7,119,687 B2 | 10/2006 | Paulsen et al. | |
| 7,142,120 B2 | 11/2006 | Charych et al. | |
| 7,147,246 B2 | 12/2006 | Breed et al. | |
| 7,156,312 B2 | 1/2007 | Becker et al. | |
| 7,170,412 B2* | 1/2007 | Knox | G01S 3/32 340/572.1 |
| 7,215,976 B2 | 5/2007 | Brideglall | |
| 7,308,202 B2 | 12/2007 | Roes et al. | |
| 7,310,045 B2 | 12/2007 | Inui | |
| 7,378,967 B2 | 5/2008 | Sullivan et al. | |
| 7,388,501 B2 | 6/2008 | Tang et al. | |
| 7,403,120 B2 | 7/2008 | Duron et al. | |
| 7,453,363 B2 | 11/2008 | Reynolds | |
| 7,504,952 B2 | 3/2009 | Kaplan et al. | |
| 7,511,604 B2 | 3/2009 | Raphaeli et al. | |
| 7,561,048 B2 | 7/2009 | Yushkov et al. | |
| 7,580,378 B2 | 8/2009 | Carrender et al. | |
| 7,609,163 B2 | 10/2009 | Shafer | |
| 7,689,195 B2 | 3/2010 | Wu et al. | |
| 7,907,056 B2 | 3/2011 | Shimizu | |
| 7,924,160 B1* | 4/2011 | LaPenta | G08B 13/2422 310/313 B |
| 8,242,888 B2 | 8/2012 | Tuttle | |
| 8,294,554 B2 | 10/2012 | Shoarinejad et al. | |
| 8,461,966 B2 | 6/2013 | Tuttle | |
| 8,633,805 B2 | 1/2014 | Tuttle | |
| 8,830,062 B2* | 9/2014 | Tuttle | G01S 13/282 340/572.1 |
| 9,030,301 B2 | 5/2015 | Tuttle | |
| 9,477,863 B2 | 10/2016 | Tuttle | |
| 9,690,961 B2 | 6/2017 | Tuttle | |
| 10,162,992 B2 | 12/2018 | Tuttle | |
| 2002/0019702 A1 | 2/2002 | Nysen | |
| 2002/0149480 A1* | 10/2002 | Shanks | G06K 7/0008 340/572.1 |
| 2003/0147651 A1 | 8/2003 | Roes et al. | |
| 2004/0178944 A1 | 9/2004 | Richardson et al. | |
| 2004/0217865 A1 | 11/2004 | Turner | |
| 2005/0012653 A1 | 1/2005 | Heide et al. | |
| 2005/0040994 A1 | 2/2005 | Mazoki et al. | |
| 2005/0052287 A1* | 3/2005 | Whitesmith | G01S 13/751 340/13.26 |
| 2005/0237159 A1 | 10/2005 | Cooper et al. | |
| 2005/0237953 A1 | 10/2005 | Carrender et al. | |
| 2005/0253725 A1 | 11/2005 | Neuwirth et al. | |
| 2005/0258937 A1 | 11/2005 | Neuwirth | |
| 2005/0280539 A1 | 12/2005 | Pettus | |
| 2006/0001525 A1* | 1/2006 | Nitzan | G06K 19/0702 340/10.1 |
| 2006/0038676 A1 | 2/2006 | Richards | |
| 2006/0043199 A1 | 3/2006 | Baba et al. | |
| 2006/0220794 A1 | 10/2006 | Zhu | |
| 2006/0238301 A1 | 10/2006 | Wu et al. | |
| 2006/0244580 A1* | 11/2006 | Nordmeyer | B60G 17/01933 340/438 |
| 2006/0273905 A1 | 12/2006 | Choi et al. | |
| 2007/0001814 A1 | 1/2007 | Steinke et al. | |
| 2007/0030151 A1* | 2/2007 | Morrow | B29C 45/14 340/572.1 |
| 2007/0037582 A1 | 2/2007 | Mohi et al. | |
| 2007/0109099 A1 | 5/2007 | Raphaeli et al. | |
| 2007/0139200 A1* | 6/2007 | Yushkov | H04B 1/0003 340/572.1 |
| 2007/0149216 A1 | 6/2007 | Misikangas | |
| 2007/0152831 A1 | 7/2007 | Eisele | |
| 2007/0152833 A1 | 7/2007 | Kaplan et al. | |
| 2007/0182578 A1 | 8/2007 | Smith | |
| 2007/0247311 A1 | 10/2007 | Muchkaev | |
| 2007/0268140 A1 | 11/2007 | Tang et al. | |
| 2008/0012712 A1 | 1/2008 | Shimizu | |
| 2008/0021651 A1 | 1/2008 | Seeley et al. | |
| 2008/0061976 A1 | 3/2008 | Shafer | |
| 2008/0180218 A1 | 7/2008 | Flax | |
| 2008/0197982 A1* | 8/2008 | Sadr | H03M 13/2957 340/10.4 |
| 2008/0231424 A1 | 9/2008 | Arnitz | |
| 2008/0238685 A1 | 10/2008 | Tuttle | |
| 2008/0238686 A1 | 10/2008 | Tuttle | |
| 2008/0252293 A1* | 10/2008 | Lagae | G01S 7/411 324/318 |
| 2008/0252422 A1 | 10/2008 | Dowla et al. | |
| 2008/0280560 A1 | 11/2008 | Tuttle | |
| 2008/0318682 A1* | 12/2008 | Rofougaran | A63F 13/235 463/39 |
| 2008/0318683 A1 | 12/2008 | Rofougaran et al. | |
| 2009/0091428 A1 | 4/2009 | Tuttle | |
| 2009/0091454 A1 | 4/2009 | Tuttle | |
| 2009/0303004 A1 | 12/2009 | Tuttle | |
| 2009/0303005 A1 | 12/2009 | Tuttle | |
| 2010/0123558 A1 | 5/2010 | Park et al. | |
| 2010/0253481 A1 | 10/2010 | Zand | |
| 2012/0268253 A1 | 10/2012 | Tuttle | |
| 2012/0268308 A1 | 10/2012 | Tuttle | |
| 2013/0241708 A1 | 9/2013 | Tuttle | |
| 2014/0104042 A1 | 4/2014 | Tuttle | |
| 2015/0227770 A1 | 8/2015 | Tuttle | |
| 2017/0032157 A1 | 2/2017 | Tuttle | |
| 2017/0262669 A1 | 9/2017 | Tuttle | |
| 2019/0095661 A1 | 3/2019 | Tuttle | |
| 2019/0257937 A1 | 8/2019 | Tuttle | |
| 2019/0266366 A1 | 8/2019 | Tuttle | |

OTHER PUBLICATIONS

International Application No. PCT/US08/54901, International Search Report, dated Jul. 28, 2008.
International Application No. PCT/US08/54901, Written Opinion, dated Jul. 28, 2008.
International Application No. PCT/US08/55537, International Search Report, dated Jul. 30, 2008.
International Application No. PCT/US08/55537, Written Opinion, dated Jul. 30, 2008.
International Application No. PCT/US08/56247, International Search Report, dated Aug. 14, 2008.
International Application No. PCT/US08/56247, Written Opinion, dated Aug. 14, 2008.
Page, Raymond, "A Low Power RFID Transponder," RF Design, pp. 31-32, 34, 36, Jul. 1993.
Trolley Scan (Pty) Ltd., RFID-radar Newsletters No. 1—No. 12, Oct. 2005-Jan. 2007.
Systems and Methods to Determine Motion Parameters Using Rfid Tags, U.S. Appl. No. 14/132,482, filed Dec. 18, 2013, John Tuttle, Notice of Allowance Mailed—Application Received in Office of Publications, dated Jun. 27, 2016.
Systems and Methods to Determine Motion Parameters Using Rfid Tags, U.S. Appl. No. 15/295,103, filed Oct. 17, 2016, John Tuttle, Docketed New Case—Ready for Examination, Nov. 15, 2016.
Systems and Methods to Determine Kinematical Parameters Using Rfid Tags, U.S. Appl. No. 13/891,101, filed May 9, 2013, John Tuttle, Patented Case, Apr. 22, 2015.
Systems and Methods to Determine Kinematical Parameters Using Rfid Tags, U.S. Appl. No. 14/696,247, filed Apr. 24, 2015, John Tuttle, Non Final Action, dated Oct. 6, 2016.
Systems and Methods to Determine Motion Parameters Using Rfid Tags, U.S. Appl. No. 12/134,103, filed Jun. 5, 2008, John Tuttle, U.S. Pat. No. 8,242,888, Aug. 14, 2012.
Systems and Methods to Determine Motion Parameters Using Rfid Tags, U.S. Appl. No. 13/533,890, filed Jun. 26, 2012, John Tuttle, U.S. Pat. No. 8,633,805, Jan. 21, 2014.

(56) References Cited

OTHER PUBLICATIONS

Systems and Methods to Determine Motion Parameters Using Rfid Tags, U.S. Appl. No. 14/132,482, filed Dec. 18, 2013, John Tuttle, U.S. Pat. No. 9,477,863, Oct. 25, 2016.
Systems and Methods to Determine Motion Parameters Using Rfid Tags, U.S. Appl. No. 15/295,103, filed Oct. 17, 2016, John Tuttle, Non Final Action, dated Jun. 28, 2017.
Systems and Methods to Use Radar in Rfid Systems, U.S. Appl. No. 12/134,106, filed Jun. 5, 2008, John Tuttle, U.S. Pat. No. 8,830,062, Sep. 9, 2014.
Systems and Methods to Determine Kinematical Parameters Using Rfid Tags, U.S. Appl. No. 12/134,107, filed Jun. 5, 2008, John Tuttle, U.S. Pat. No. 8,461,966, Jun. 11, 2013.
Systems and Methods to Determine Kinematical Parameters Using Rfid Tags, U.S. Appl. No. 13/891,101, filed May 9, 2013, John Tuttle, U.S. Pat. No. 9,030,301, May 12, 2015.
Systems and Methods to Determine Kinematical Parameters Using Rfid Tags, U.S. Appl. No. 14/696,247, filed Apr. 24, 2015, John Tuttle, Notice of Allowance Mailed—Application Received in Office of Publications, dated Feb. 8, 2017.
Systems and Methods to Determine Kinematical Parameters Using Rfid Tags, U.S. Appl. No. 15/598,199, filed May 17, 2017, John Tuttle, Docketed New Case—Ready for Examination, Jun. 8, 2017.

\* cited by examiner

SYSTEMS AND METHODS TO USE RADAR IN RFID SYSTEMS

RELATED APPLICATIONS

The present application is a continuation application of U.S. patent application Ser. No. 12/134,106, filed Jun. 5, 2008 and entitled "Systems and Methods to Use Radar in RFID Systems", the entire disclosure of which is hereby incorporated herein by reference.

FIELD OF THE TECHNOLOGY

At least some embodiments disclosed herein relate to radio frequency identification (RFID) systems and radar systems.

BACKGROUND

A typical radio frequency identification (RFID) tag has a memory configured to store data, such as data that uniquely identifies the tag among a plurality of RFID tags. An RFID reader can be used to communicate with RFID tags over a radio link. Thus, the identity of the tag and the object labeled by the tag can be determined by the RFID reader in an automated process.

In a typical RFID system, an RFID reader is configured to interrogate the tags via radio frequency electromagnetic waves. The RFID reader broadcasts commands using a beam of electromagnetic wave. In response to the interrogation signals from the RFID reader, an RFID tag can be selected to produce a radio frequency response signal.

An RFID tag may be passive, semi-passive or active, depending on the power source of the RFID tag and how the response from the RFID is generated.

A passive RFID tag does not have an internal battery or power source. A passive RFID tag operates using the power drawn from the interrogating electromagnetic wave. A passive RFID tag provides responses through modulating the interrogating electromagnetic wave backscattered by the tag.

A semi-active RFID tag operates using the power drawn from its internal battery or power source. A semi-active RFID tag provides responses through modulating the interrogating electromagnetic wave backscattered by the tag.

An active tag that has an internal battery or power source, using which a separate transmission signal is generated to provide the response. The response signal is generated independent from the interrogating electromagnetic wave.

Radio frequency identification (RFID) tags are used in a variety of applications, such as tagging vehicles on toll roads, tagging shipping containers, quality control on assembly line conveyor belts, and monitoring tactical military equipment maneuvers, etc.

RFID systems typically operate at Ultra High Frequency (UHF) band (300-1000 MHz) or lower microwave bands (e.g., 900 MHz to 2.45 GHz).

Radar systems have been used by police, air traffic controllers and the military for monitoring the presence, distance, direction (from the radar antenna) or speed of individual vehicles or objects, such as airplane and automobile. A traditional radar system detects the presence of an object based on echo of radio frequency signals reflected by the object, measures the distance to the object based on the time delay of a radio frequency signal reflected from the object, in some cases measures the direction from the radar antenna and/or determines the speed of the object based on Doppler shift in a radio frequency signal reflected from the object.

A traditional radar system transmits pulses of electromagnetic waves to detect presence and/or distance. A pulse typically includes an electromagnetic wave having a frequency ranging from below 1 Giga Hertz to over 30 Giga Hertz. An example of the duration of a pulse is in the order of 1 microsecond. Pulses of electromagnetic waves are transmitted repeatedly to detect echoes from different directions and/or to obtain repeated measurements. After the radar transmitter sends the pulse, the radar receiver is used to detect the echo of the pulse until the radar transmitter is used to send the next pulse.

A continuous-wave radar system transmits a continuous electromagnetic wave while its receiver detects the reflected wave. Through detecting the Doppler shift in the reflected wave, the speed of the object that reflects the wave is determined.

Doppler effect is the change in the observed frequency of a wave, as perceived by an observer, when the source of the wave is moving relative to the observer. The frequency observed by the observer increases if the source of the wave moves towards the observer; and the observed frequency decreases if the source of the wave moves away from the observer.

In some continuous-wave radar systems, the electromagnetic wave is modulated in frequency or phase such that the frequency or phase modulation pattern in the received wave can be compared to determine the time delay in the received wave. Thus, such a continuous-wave radar system can also determine both the range and the speed of the object along the line between the object and the radar antenna.

Various radar systems are used in various frequency bands. For example, coastal radar systems operate in the frequency band of 3-30 MHz, long range air traffic control and surveillance radar systems in the frequency band of 1-2 GHz, terminal air traffic control radar systems in the frequency band of 2-4 GHz, airport radar systems in the range of 8-12 GHz, police radar guns in the range of 8-40 GHz, etc.

SUMMARY OF THE DESCRIPTION

Systems and methods to use radar systems for radio frequency identification (RFID) applications are described herein. Some embodiments are summarized in this section.

In one embodiment, radar systems are adapted to use RFID communications protocols and methods to enhance the usefulness of radar systems beyond the determination of the presence, distance, direction and/or speed of a vehicle or object, to additionally include the transmission of data such as object identification and additional messages or data, such as data obtained from a connected onboard computer of a vehicle.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
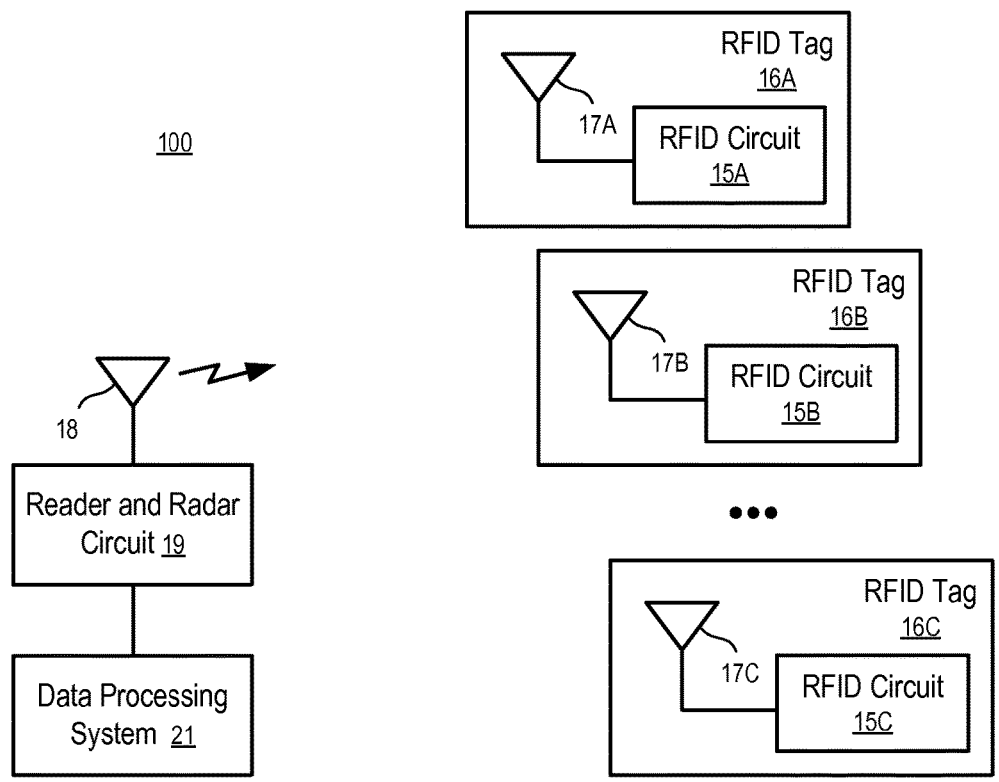
FIG. 1 shows a radio frequency identification (RFID) system according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Traditional radar systems are used to detect the presence of objects and/or to measure the distance, direction and the speed of the objects. However, traditional radar systems are not used for data communications between the detected objects and the radar system. Data communication is typically achieved via a separate communication channel.

At least one embodiment of the disclosure uses radar systems to transmit information for radio frequency identification (RFID) systems. For example, when an RFID tag is attached to a vehicle, information such as license information, owner, registration data, vehicle type and description, manufacturer, date of manufacture, etc, can be transmitted from an RFID tag via the radar signals that are typically used to determine the position and/or speed of the vehicle in radar systems. When the RFID tag is connected to an onboard computer of the vehicle, various vehicle operation statuses, such as speed, location, fuel level, heading, etc., can be reported through interrogating the RFID tag via the radar signals. RFID tags can also be used to tag other objects. For example, RFID tagged weather balloons can be detected using a radar system; and the weather data can be transmitted via the RFID tag through the radar signals according to various embodiments described in the present disclosure. The use of radar-based RFID system obviates the need for expensive and heavy radio equipment for data communications. In general, various remote data could be collected using combined Radar/RFID systems described herein. The RFID tag can be carried by an airplane or placed in a central location such as on a mountain top.

In one embodiment, the RFID tag is semi-active and powered by the vehicle power source. Alternatively, the RFID tag is passive. The RFID tag transmits data via modulating reflection of radar signals. For example, the antenna of the RFID tag can be designed to selectively backscatter radar signals received from the radar transmitter or absorb radar signals, according to the data that is being transmitted from the RFID tag.

In one embodiment, an RFID vehicle tag is connected an on-board computer, which optionally may be connected to a network. The RFID vehicle tag stores an identification number that is indicative of the vehicle; and the information about the vehicle can be looked up from a database, after the identification number is received from the RFID tag via radar signals. Alternatively, or in combination, the data stored in the on-board computer can be selectively requested via the radar signals using the RFID vehicle tag. The tag data transmitted via the radar signal can be encrypted to enhance security and/or privacy. In one embodiment, the vehicle tag may add noise to the reflected wave to confound snoopers. The tag may have different antennas placed at different locations on the vehicle, any or all of which may be selectable.

In one embodiment, the RFID vehicle (object) tag is designed to absorb power when not being instructed to transmit (e.g., for stealth application, to reduce noise, etc.). The RFID vehicle tag can be instructed to transmit using the radar signals modulated with a predetermined command. In one embodiment, radar signals can be used to selectively silence some RFID vehicle tags and select one vehicle tag for data communications.

FIG. 1 shows a radio frequency identification (RFID) system according to one embodiment. In FIG. 1, the system (100) includes a data processing system (21) coupled to an RFID reader and radar circuit (19). The data processing system (21) may include a general purpose computer, or a special purpose computer, or a set of computers coupled to the reader and radar circuit (19) via a data communication network, such as a local area network, Internet, etc.

In FIG. 1, the reader and radar circuit (19) communicates with one or more RFID tagged objects (e.g., 16A, 16B, . . . , 16C) via the antenna (18). The reader and radar circuit (19) powers the antenna (18) which sends radar signals to detect the presence, distance, direction, and/or speed of the RFID tags (e.g., 16A, 16B, . . . , 16C) and/or the objects that carry the RFID tags (not shown in FIG. 1). The reader and radar circuit (19) can further modulate the signals transmitted via the antenna (18) to send commands to the RFID tags (e.g., 16A, 16B, . . . , 16C). The reader and radar circuit (19) can further detect data modulated by one or more of the RFID tagged objects on the reflected signals.

In FIG. 1, the RFID tags (e.g., 16A, 16B, . . . , 16C) include their individual tag antennas (e.g., 17A, 17B, . . . , 17C) to receive the interrogating electromagnetic wave, and corresponding RFID circuits (e.g., 15A, 15B, . . . , 15C) to process the commands received from the RFID reader. Based on the commands, the RFID tags (e.g., 16A, 16B, . . . , 16C) can be selectively silenced (e.g., being placed in a mode to reduce interrogating electromagnetic wave backscattered from the tag, or not to actively transmit any signals using its internal power source), or be instructed to produce a response (e.g., via backscattering or actively transmitting).

In one embodiment, the antenna (18) is used not only to transmit radar signals to detect and measure as in a radar system, but also to identify the reflecting object to which the RFID tag is attached and to communicate with the RFID tag. For example, in one embodiment, the reader and radar circuit (19) can be used in a radar mode to measure distance (or direction or speed) between an RFID tag (e.g., 16A, or 16B, or 16C) and the reader antenna (18) and in a reader mode to send commands to the RFID tag and/or receive data from the RFID tag. For example, in another embodiment, the reader and radar circuit (19) can be used to detect and measure and to interrogate concurrently using the same electromagnetic wave.

In one embodiment, one of the RFID tagged objects is instructed to be responsive to the reader and radar circuit (19) while other RFID tagged objects are silenced (or being out of range). For example, the interrogation signal from the antenna (18) is received by the tag antenna (17A) and passed to the RFID circuit (15A) for processing. If the interrogation signal triggers a response, the RFID circuit (15A) uses its tag antenna (17A) to send to the reader and radar circuit (19) a response, such as tag identification information or other data stored in the memory of the tag (16A).

In one embodiment, the object that carries the RFID tag is less reflective than an RFID tag that is in a reflective mode. Thus, the RFID tags can be selectively placed in the reflective mode to allow the radar system to detect and measure. Thus, the system can selectively turn on the RFID tag for enhanced visibility to the radar systems and for precision measurement of an RFID tag among a population of RFID tags.

In another embodiment, the objects that carry the RFID tags may be as reflective as the RFID tags. The distance and the speed of the objects may be detected and measured using the radar system without the assistance of the RFID tags. The RFID tags are used to transmit data to the data processing system (21) by using the radar signals as the interrogating electromagnetic waves of an RFID system. Thus, the capability of the radar system is expanded and enhanced.

In FIG. 1, the reader and radar circuit (19) passes the data obtained from the RFID tags to the data processing system (21), which performs any suitable function. For example, based on the data received from the RFID tags (e.g., 16A, 16B, ..., 16C), the data processing system (21) may allow access to a building or parking garage, note the entrance of an employee to a work location, direct a parcel identified by the RFID tag down a particular conveyor system, or conduct inventory of products in a shopping cart for purposes of checkout and payment.

In one embodiment, the RFID tagged object is instructed to provide a response via modulating the amplitude of the backscattered the electromagnetic wave from the antenna (18), or remaining at a high backscattering state (e.g., in a backscattering mode), while other RFID tags are silenced (e.g., remaining at a low backscattering state) or out of the interrogation range. When an RFID tag is silenced, the interrogating electromagnetic wave backscattered from the silenced RFID tag is negligible; and thus the silenced RFID tag is not considered in a backscattering mode.

Figure 2:
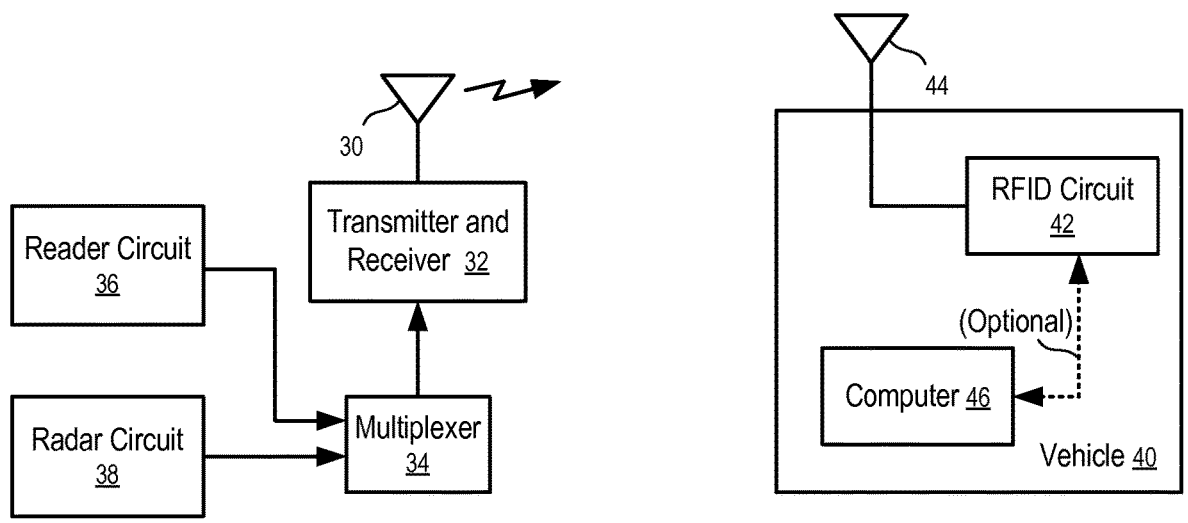
FIG. 2 shows another RFID system according to one embodiment.

FIG. 2 shows another RFID system according to one embodiment. In FIG. 2, the reader circuit (36) and the radar circuit (38) are selectively coupled to the transmitter and receiver (32) via the multiplexer (34). When the radar circuit (38) is in control of the transmitter and receiver (32), the antenna (30) is used as a radar antenna to transmit radar signals to detect the presence and measure the direction, distance, and/or speed of the vehicle (40). When the reader circuit (36) is in control of the transmitter and receiver (32), the antenna (30) is used as a reader antenna to transmit interrogating electromagnetic waves to the RFID tag attached to the vehicle (40).

In FIG. 2, the RFID vehicle tag including a tag antenna (44) and an RFID circuit (42). The RFID circuit (42) may optionally be connected to an onboard computer (46) to provide data such as the speed, location, altitude, license number, and other data related to the vehicle. The onboard computer may collect various operation status data from various instruments mounted on the vehicle. Thus, the reader circuit (36) can control the transmitter and receiver (32) to obtain identification of the RFID circuit (42) and/or other data provided by the computer (46).

In FIG. 2, the reader circuit (19) uses the same antenna (18) to transmit and to receive. In alternative embodiments, separate antennas are used to transmit and to receive. In alternative embodiments, separate receivers may be used.

In one embodiment, the reader circuit (36) filters the received signals to detect the data modulated in the electromagnetic wave reflected by the antenna (44); and the radar circuit (38) filters the received signals to detect the echo and measure the time delay and/or frequency shift in the electromagnetic wave reflected by the vehicle (40).

In FIG. 2, the reader circuit (36) and the radar circuit (38) need not use the transmitter and receiver (32) concurrently. Thus, the signals transmitted by the radar circuit (38) and the reader circuit (36) can have different characteristics.

For example, the signal transmitted by the radar circuit may be in the form of a pulse; and the transmission of the pulse stops before the early transmitted portion of the electromagnetic wave is reflected back from the vehicle. The interrogating electromagnetic wave by the reader circuit can be transmitted long enough to allow the RFID circuit to modulate the data on the reflected interrogating electromagnetic wave. The transmission of interrogating electromagnetic wave and the receiving of the wave backscatter from the antenna (44) may overlap in time. Alternatively, the radar and RFID pulses may occur together with one following the other in the same transmission, or separately in time where there is no overlap of the returning pulses.

In one embodiment, the reader circuit (36) and the radar circuit (38) control the transmitter and receiver (32) to send electromagnetic waves of substantially the same carrier frequency (or substantially the same frequency). Alternatively, the reader circuit (36) and the radar circuit (38) may transmit interrogating electromagnetic waves and radar signals in different frequencies (e.g., as in frequency hopping). Alternatively, the reader circuit (36) and the radar circuit (38) may transmit interrogating electromagnetic waves and radar signals in any other means of spread spectrum communication (Direct Sequence or Chirps, for example).

In one embodiment, radar signals transmitted under the control of the radar circuit (38) include frequency or phase modulations for pulse compression and/or for detection of time delay in the reflected radar signals. The interrogating electromagnetic wave is modulated to indicate a command and/or data sent to the RFID circuit (42) (e.g., modulated in amplitude) and not modulated to receive data from the RFID circuit (42).

In FIG. 2, the radar signals and the interrogating electromagnetic waves are transmitted separately. Alternatively, a same electromagnetic wave can be transmitted for both data communication and for detection and measuring.

Figure 3:
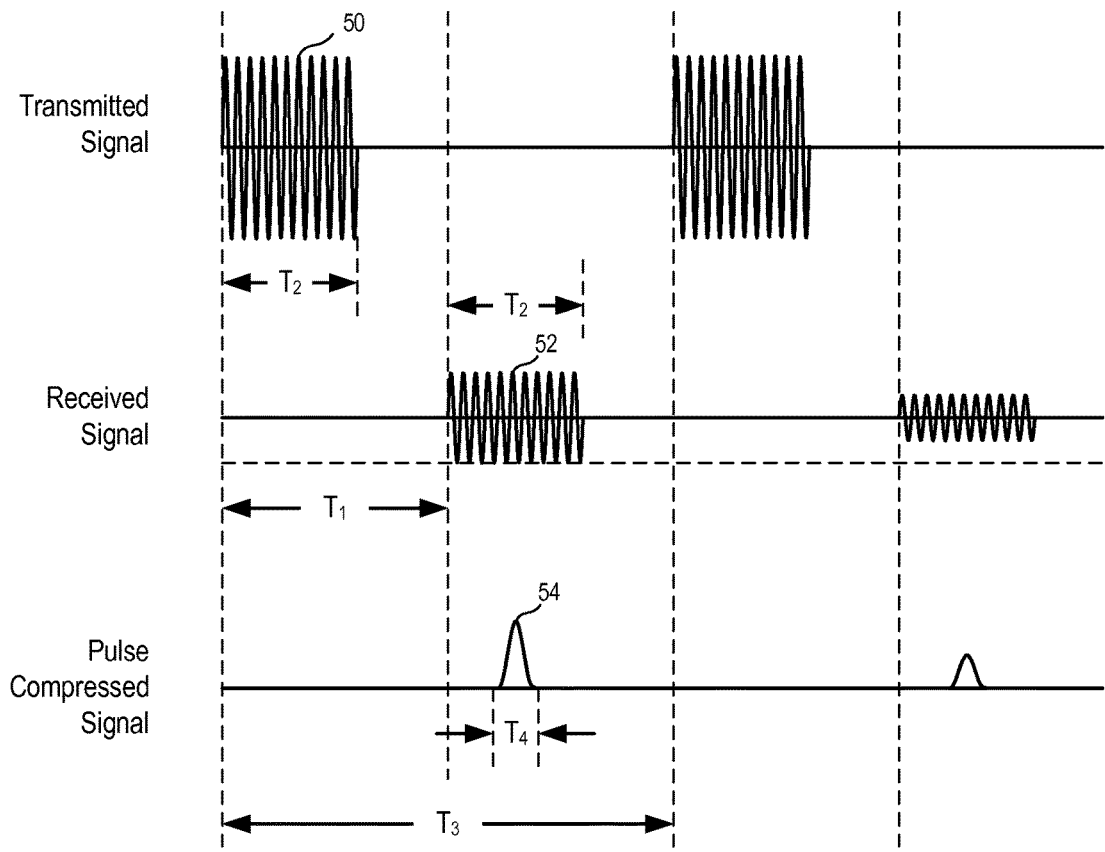
FIG. 3 shows waveforms of a plurality of signals in an RFID system using pulsed radar signals according to one embodiment.

FIG. 3 shows waveforms of a plurality of signals in an RFID system using pulsed radar signals according to one embodiment. In FIG. 3, the transmitted radar signals (50) are in a form of pulses having duration of $T_2$ and a repetition period $T_3$. The received signals, reflected from the RFID tag, have a time delay $T_1$ relative to the corresponding transmitted radar signal. The time delay represents the round trip travel time by the radar signal over the distance between the radar antenna and the RFID tag (and the object having the RFID tag). Since the speed of the radar signal is known, a measurement of the time delay (round trip time) can be used to calculate the distance between the radar antenna and the RFID tag (and the object having the RFID tag).

In one embodiment, the radar signal transmitted (e.g., 50) is frequency or phase modulated for pulse compression. After the received signal (e.g., 52) is processed for pulse compression (e.g., through correlation or matched filter), the pulse compressed signal (e.g., 54) has a pulse duration $T_4$ that is much shorter than the duration $T_2$ of the transmitted pulse (e.g., 50). The pulse compression technique allows the radar system to improve distance resolution and to improve signal to noise ratio.

In one embodiment, the RFID tag modulates data on the separately reflected pulses. For example, a predetermined number of bits can be modulated on each reflected pulse to transmit data from the RFID tag to the radar based reader. To use the compressed pulse to improve signal to noise radio, the RFID tag can limit modulation to one bit on each pulse. Thus, the amplitude of the compressed pulses can be used to detect the bits of data transmitted by the RFID tag.

The radar signals can also be modulated by the radar transmitter to send commands to the RFID tag (not shown in FIG. 3). For example, a predetermined number of bits can be modulated on each radar pulse to transmit the commands. For example, a group of amplitude modulated radar pulses can be used to transmit a command; and a group of radar pulses of the same magnitude can be transmitted to allow the RFID tag to modulate response on the reflected radar signals via backscattering using RFID tag antenna.

In some embodiments, the Doppler shift in the reflected radar pulses is also detected to determine the speed of the RFID tag.

Figure 4:
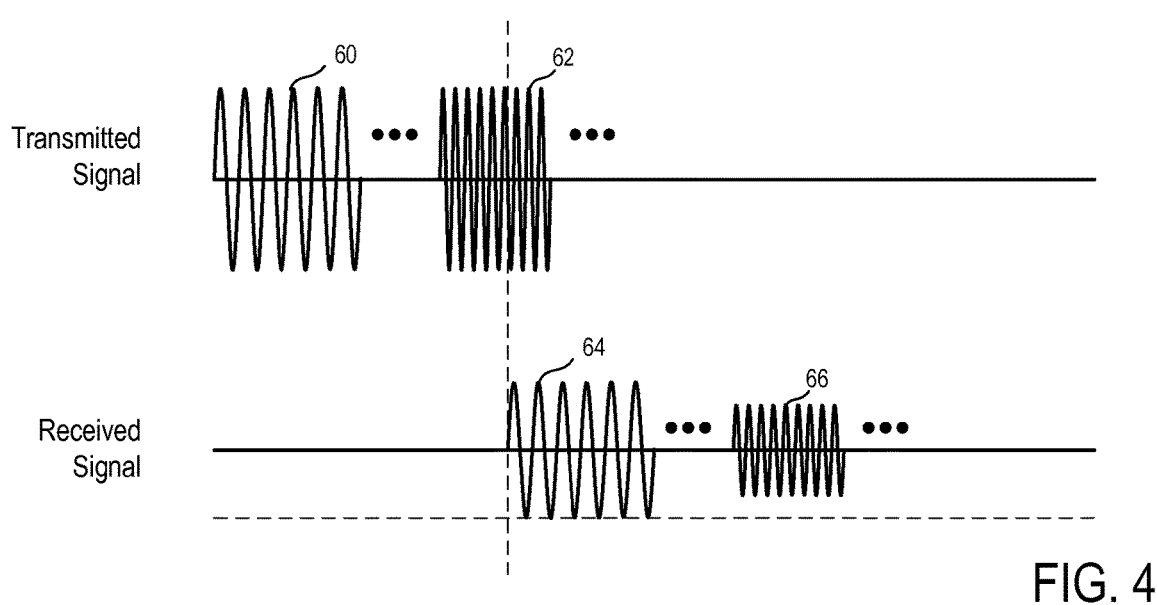
FIG. 4 shows waveforms of a plurality of signals in an RFID system using continuous wave radar signals according to one embodiment.

FIG. 4 shows waveforms of a plurality of signals in an RFID system using continuous wave radar signals according to one embodiment. In FIG. 4, the transmitted signal wave is continuously transmitted while previously transmitted portions of the reflected wave are continuously received. For example, in FIG. 4, a first portion (60) of the transmitted wave is received as the portion (64) of the received signal when the second portion (62) is being transmitted.

In FIG. 4, different portions of the transmitted wave are modulated differently. For example, the frequency of the signal can be changed as a function of time; and the time-based frequency change can be repeated periodically to provide a continuous wave. The frequency difference between the received signal and the currently transmitted signal can be compared to determine the period of time required to generate the frequency difference according to the function of time. The determined period of time corresponds to the round trip travel time of the reflected wave. The time delay (round trip time) of the radar signal can be used to compute the distance between the radar antenna and the RFID tag.

In FIG. 4, the RFID tag modulates data on the reflected radar signal via backscattering using the antenna of the RFID tag. For example, the different portions (e.g., 64 and 66) of the reflected radar signal can be amplitude modulated to transmit the tag data and/or other data (e.g., the location, amplitude, fuel level, speed, heading, etc., obtained from an onboard computer of a vehicle), when the corresponding portions of the transmitted portions (e.g., 60 and 62) have the same amplitude.

The radar system can also use the continuous wave radar signal as interrogating electromagnetic wave to send commands and/or data to the RFID tag (not shown in FIG. 4).

In one embodiment, the continuous wave radar signal is not frequency or phase modulated. The frequency shift in the reflected continuous wave radar signal is used to detect the Doppler shift and to compute the speed of the RFID tag.

In some embodiments, continuous wave radar signals are modulated to detect the time delay (round trip time) of the radar signal and also used to detect the Doppler shift. Such continuous wave radar signals can also be used as interrogating electromagnetic waves to send commands/data to the RFID tag and/or to receive data from the RFID tag.

Figure 5:
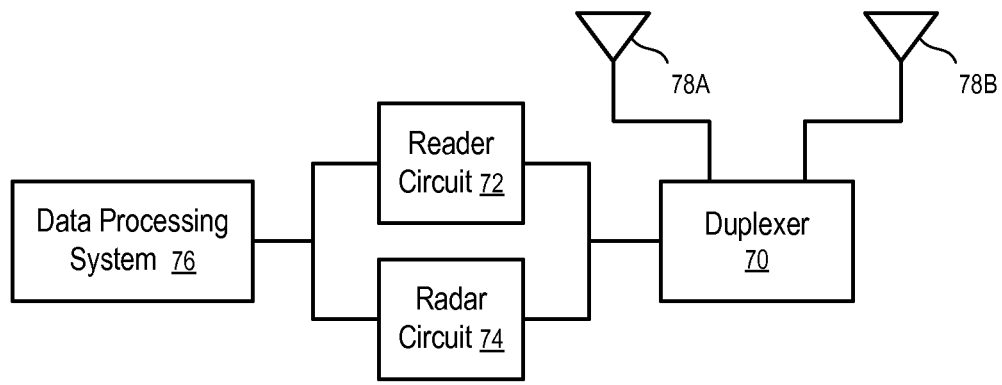
FIG. 5 shows an RFID reader with multiple antennas according to one embodiment.

FIG. 5 shows an RFID reader with multiple antennas. In FIG. 5, the reader circuit (72) and the radar circuit (74) can be used concurrently to interrogate and to detect and measure. The duplexer (70) connects the reader circuit (72) and the radar circuit (74) to the antennas (78A and 78B) one at a time.

For example, when the reader circuit (72) and the radar circuit (74) are connected by the duplexer (70) to the antenna (78A) for transmission, the radar circuit (74) controls the radar aspects of the transmitted signal; and the reader circuit (74) controls the interrogating aspects of the transmitted signal. For example, the radar circuit (74) may frequency or phase modulate the transmitted signal for pulse compression and/or for detection of time delay, while the reader circuit (74) may amplitude modulate the transmitted signal to send commands/data or maintain constant transmission amplitude to receive data from an RFID tag.

For example, when the reader circuit (72) and the radar circuit (74) are connected by the duplexer (70) to the antenna (78B) for reception, the radar circuit (74) processes the receive signal to detect echo or Doppler shift and to measure distance or speed, while the reader circuit (74) recovers data that is modulated by an RFID tag on the reflected signal.

In FIG. 5, the data processing system (76) may selectively control the operation of the reader circuit (72) and the radar circuit (74). For example, the data processing system (76) may turn off the reader circuit (72) to operate in a radar mode. In some embodiments, the data processing system (76) may turn off the radar circuit (74) to operate in a reader mode. When both the reader circuit (72) and the radar circuit (74) are used concurrent, the system operations in a combined reader and radar mode.

Figure 6:
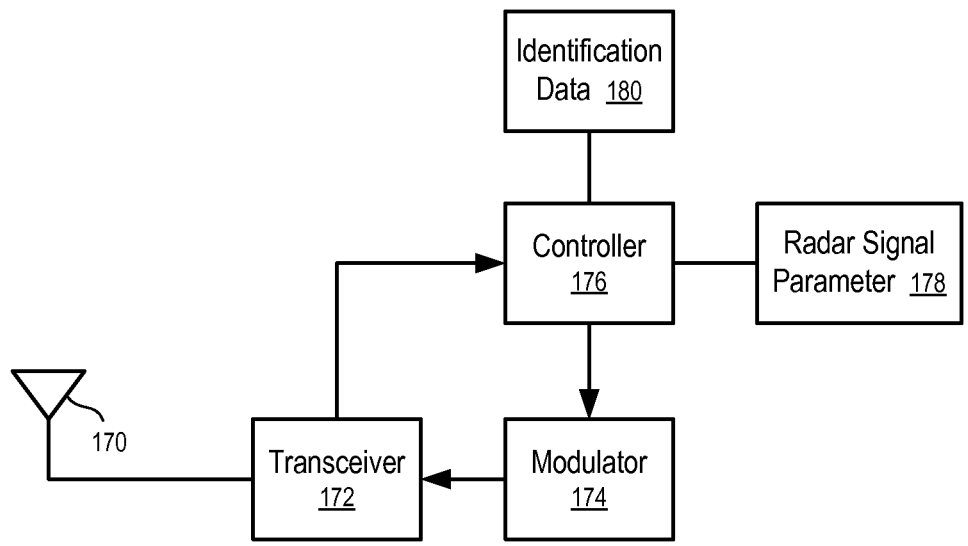
FIG. 6 shows a block diagram of an RFID tag according to one embodiment.

FIG. 6 shows a block diagram of an RFID tag according to one embodiment. In FIG. 6, the tag includes a tag antenna (170), a transceiver (172), a modulator (174), a memory for tag identification data (180), a controller (176) and a memory for radar signal parameters (178). The transceiver (172), modulator (174), memory for tag identification data (180), controller (176) and counter (178) can be implemented on an Integrated Circuit (IC) chip.

In FIG. 6, when the transceiver (172) receives a command to read the identification data (180), the controller (176) can modulate the carrier signal by switching the tag between a high backscattering mode and a low backscattering mode via the modulator (174). In one embodiment, when the controller (176) receives a command, the controller (176) causes the modulator (174) to set the tag in the high backscattering mode for a period of time to assist radar detection and measurement.

In FIG. 6, the memory (178) stores one or more parameters that characterize the radar signals used in the system, such as pulse repetition frequency, pulse duration, etc., to assist modulation of data over a plurality of separate pulses of radar signals.

In some embodiments, the RFID tag modulates a bit of data in response to each pulse of radar signal; thus, the RFID tag can be automatically adapted to respond to interrogation from radar systems of different radar signal characteristics.

In some embodiments, the RFID tag further includes a network interface to communicate with a computer (e.g., an onboard computer of a vehicle, such as a car, an airplane, a ship, etc.) (not shown in FIG. 7).

Figure 7:
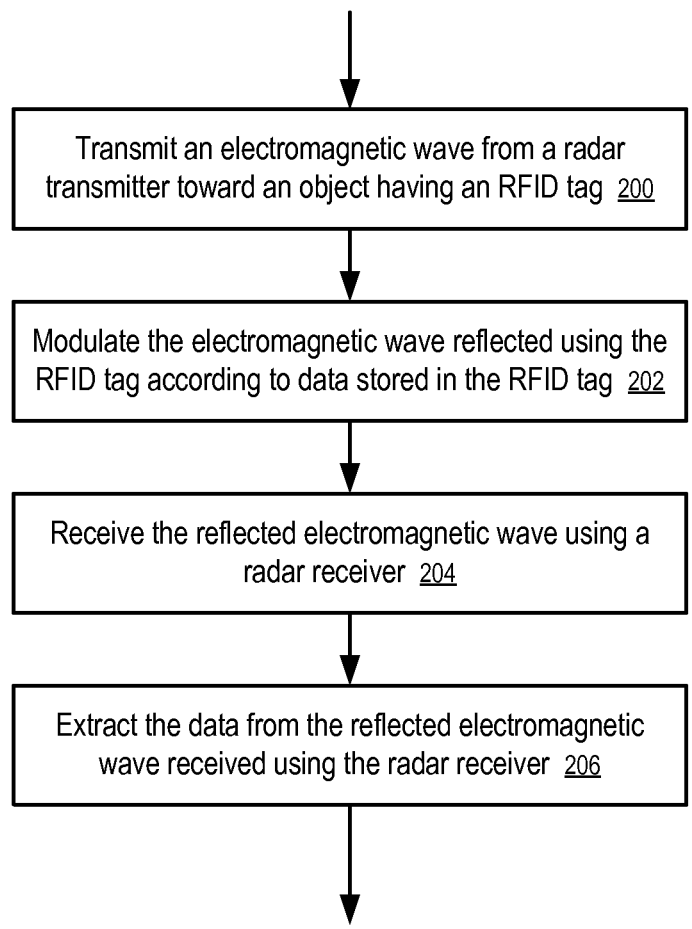
FIG. 7 shows a method implemented in an RFID system according to one embodiment.

FIG. 7 shows a method implemented in an RFID system according to one embodiment. In FIG. 7, an electromagnetic wave is transmitted (200) from a radar transmitter toward an object having an RFID tag. The RFID tag modulates (202) the electromagnetic wave reflected from the tag according to data stored in the RFID tag. A radar receiver is used to receive (204) the reflected electromagnetic wave. The data is then extracted (206) from the reflected electromagnetic wave received using the radar receiver.

In one embodiment, a range to the object is also determined using the reflected electromagnetic wave. The electromagnetic wave transmitted from the radar transmitter may be a pulse of electromagnetic wave; a time delay of the pulse is measured to determine the range; and the RFID tag modulates the data on a plurality of separate pulses transmitted from the radar transmitter. In one embodiment, the pulse of electromagnetic wave is modulated to achieve pulse compression in detecting the reflected electromagnetic wave.

In one embodiment, the RFID tag modulates the reflected electromagnetic wave through switching between a first state and a second state, where the RFID tag is more reflective in the second state than in the first state. For example, an antenna of the RFID tag can be connected to or disconnected from ground to be in an absorptive state and a reflective state, respectively.

In one embodiment, an electromagnetic wave is modulated to represent a command to the RFID tag and transmitted from the radar transmitter to the RFID tag; and the modulating of the electromagnetic wave reflected using the RFID tag according to the data stored in the RFID tag is in response to the command.

In one embodiment, a speed of the object is determined using the reflected electromagnetic wave (e.g., through determining a Doppler frequency shift in the reflected electromagnetic wave).

In one embodiment, the radar transmitter continuously transmits the electromagnetic wave while the radar receiver receives reflected the electromagnetic wave; and the electromagnetic wave transmitted by the radar transmitter and the reflected electromagnetic wave received by the radar receiver are compared to determine a round trip time of the reflected electromagnetic wave.

In one embodiment, a separate electromagnetic wave is transmitted from the radar transmitter toward the object; the separate electromagnetic wave reflected from the object is received using the radar receiver; and a range to the object or a rate of changing range to the object is determined based on the separate electromagnetic wave reflected from the object and received using the radar receiver.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A radio frequency identification (RFID) system, comprising:
an RFID tag storing one or more parameters that characterize radar signals used in the system and having a controller that adjusts states of the RFID tag,
wherein the states include a first state and a second state,
wherein the RFID tag is more reflective in the second state than in the first state, and
wherein data in reflected radar pulses reflected from the RFID tag is modulated according to the one or more parameters, and
wherein the one or more parameters comprise at least one of pulse repetition frequency, or pulse duration, or any combination thereof; and
a radar system including:
a radar transmitter,
a radar receiver, and
an RFID reader circuit, wherein:
the radar receiver receives a pulse of radio frequency electromagnetic wave transmitted by the radar transmitter and reflected by the RFID tag,
the RFID reader circuit determines, from the pulse of radio frequency electromagnetic wave received by the radar receiver, the data reflected by the RFID tag, and
the radar system determines at least one of distance, direction and speed of objects based on pulses of radio frequency electromagnetic wave transmitted by the radar transmitter and received by the radar receiver,
the radar transmitter transmits the radio frequency electromagnetic wave in a first mode to allow the RFID reader circuit to determine the data; and the radar transmitter is to transmit in a second mode to determine a range of the RFID tag.

2. The RFID system of claim 1, wherein the RFID tag modulates the radio frequency electromagnetic wave according to a predetermined characteristic of electromagnetic waves transmitted by the radar transmitter.

3. The RFID system of claim 1, wherein the radar system determines a position of the RFID tag based on a round trip time of the radio frequency electromagnetic wave.

4. The RFID system of claim 1, wherein the radar system determines a speed of the RFID tag based on a Doppler frequency shift in the radio frequency electromagnetic wave reflected by the RFID tag.

5. A radio frequency identification (RFID) reader, comprising:

a transmitter configured to transmit pulses of a radio frequency electromagnetic wave;
a receiver configured to receive the pulses of the radio frequency electromagnetic wave reflected by an object;
a radar circuit of a radar system configured to determine at least a distance, a direction or a speed of the object based on pulses of radio frequency electromagnetic wave reflected by the object and received in the receiver;
a reader circuit configured to determine data modulated on the pulses of radio frequency electromagnetic wave reflected by the object and received in the receiver,
wherein the object modulates the data on the pulses reflected by the object using a controller according to one or more parameters stored in the object that characterize radar signals used in the system,
wherein the one or more parameters comprise at least one of pulse repetition frequency, or pulse duration, or any combination thereof, and
wherein a predetermined number of bits of the data are modulated on each of the pulses reflected by the object; and
a duplexer configured to:
couple the radar circuit to the transmitter and the receiver in a first mode, and
couple the RFID reader circuit to the transmitter and the receiver in a second mode.

6. The RFID reader of claim 5, wherein the reader circuit controls the transmitter to modulate data on a radio frequency electromagnetic wave transmitted by the transmitter.

7. A radio frequency identification (RFID) reader, comprising:
a transmitter configured to transmit pulses of a radio frequency electromagnetic wave;
a receiver configured to receive the pulses of the radio frequency electromagnetic wave reflected by an object;
a radar circuit of a radar system configured to determine at least a distance, a direction or a speed of the object based on pulses of radio frequency electromagnetic wave reflected by the object and received in the receiver;
a reader circuit configured to determine data modulated on the pulses of radio frequency electromagnetic wave reflected by the object and received in the receiver,
wherein the object modulates the data on the pulses reflected by the object using a controller according to one or more parameters stored in the object that characterize radar signals used in the system,
wherein the one or more parameters comprise at least one of pulse repetition frequency, or pulse duration, or any combination thereof,
wherein a predetermined number of bits of the data are modulated on each of the pulses reflected by the object, and
wherein the receiver has a matched filter configured to receive an input signal generated according to the pulses of radio frequency electromagnetic wave reflected by the object and received in the receiver; and a pulse width of an output of the matched filter is smaller than a pulse width of the input.

* * * * *